(12) United States Patent
Menegoli et al.

(10) Patent No.: US 8,773,088 B2
(45) Date of Patent: Jul. 8, 2014

(54) SINGLE INDUCTOR MULTIPLE OUTPUT POWER CONVERTER

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 401 days.

(21) Appl. No.: 13/332,918

(22) Filed: Dec. 21, 2011

(65) Prior Publication Data

US 2013/0162228 A1    Jun. 27, 2013

(51) Int. Cl.
  *G05F 1/577*    (2006.01)
(52) U.S. Cl.
  USPC ............................................ 323/267; 323/271
(58) Field of Classification Search
  CPC ... H02M 3/156; H02M 3/158; H02M 3/1588; H02M 3/33561; H02M 2001/009
  USPC ........................... 323/222, 267, 271, 282, 285
  See application file for complete search history.

(56) References Cited

U.S. PATENT DOCUMENTS

| | | | |
|---|---|---|---|
| 6,222,352 B1 | 4/2001 | Lenk | |
| 6,437,545 B2 * | 8/2002 | Sluijs | 323/222 |
| 6,522,110 B1 | 2/2003 | Ivanov | |
| 6,600,300 B2 * | 7/2003 | Groeneveld et al. | 323/282 |
| 6,977,447 B2 | 12/2005 | May | |
| 7,176,661 B2 | 2/2007 | Kranz | |
| 7,224,085 B2 | 5/2007 | Chen et al. | |
| 7,372,239 B2 * | 5/2008 | Kumagai et al. | 323/267 |
| 7,564,229 B2 * | 7/2009 | Odell | 323/267 |
| 7,583,066 B2 * | 9/2009 | Tolle et al. | 323/267 |
| 8,049,472 B2 | 11/2011 | Easwaran et al. | |
| 2002/0093315 A1 * | 7/2002 | Sluijs | 323/267 |
| 2004/0027104 A1 * | 2/2004 | Ishii et al. | 323/267 |
| 2012/0176822 A1 * | 7/2012 | Menegoli et al. | 363/21.18 |
| 2013/0038310 A1 * | 2/2013 | Menegoli et al. | 323/288 |
| 2013/0069611 A1 * | 3/2013 | Menegoli et al. | 323/284 |
| 2013/0082668 A1 * | 4/2013 | Tseng et al. | 323/267 |
| 2013/0162228 A1 * | 6/2013 | Menegoli et al. | 323/267 |

* cited by examiner

*Primary Examiner* — Jeffrey Sterrett

(57) ABSTRACT

A novel method to operate and control single inductor multiple output switching power converter is presented. The method includes the means for generating one or more synthetic ripple signals and operating the converter at constant switching frequency allowing high frequency operation, maintaining stability in all conditions with minimum cross regulation between the outputs independently on the levels of load present at the outputs. The method further includes means for setting the maximum frequency of multiplexing the energy stored in the inductor between the various outputs reaching the desired compromise between the value of the output capacitors, the switching frequency of the output power devices and the acceptable output voltage ripple.

Two different topologies are proposed that can be used for single inductor multiple output buck power converters and for boost power converter allowing the extension to buck-boost configurations as well.

20 Claims, 13 Drawing Sheets

SINGLE INDUCTOR MULTIPLE OUTPUT POWER CONVERTER

BACKGROUND OF THE INVENTION

1. Field of the Invention

The present invention is in the field of power converters. The present invention is further in the field of semiconductor switching power converters. The present invention further relates to the field of integrated synthetic ripple control methods for switching power converters and circuits. The present invention is further in the field of integrated switching power converters. The present invention is further in the field of hysteretic control types for switching power converters. The present invention is further in the field of single inductor multiple output switching power converters. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general, power switching converters are becoming more and more important for their compact size, cost and efficiency. Switching power converters comprise isolated and non isolated topologies. The galvanic isolation is generally provided by the utilization of transformers.

Modern switching power converters are in general divided in step-down power converters, also commonly known as "buck converters", and step-up power converters commonly known as "boost converters". This definition stems from the ability of the converter to generate regulated output voltages that are lower or higher than the input voltage regardless of the load applied.

One class of modern switching power converters implemented in integrated circuits is the one comprising hysteretic control or pseudo-hysteretic control where a synthetic ripple signal is generated and compared to a reference to determine the duty cycle of the switching period in order to regulate the output voltage at the desired level. These hysteretic power converters do not include an error amplifier, a specific compensation network or a periodic signal to determine the switching frequency.

In fact their switching frequency is determined by several factors like the input voltage, the output voltage, the load, the output capacitor value, the inductor value, the hysteresis value, and the general propagation delays of the feedback network, of the comparator, of the driver, and of the output stage. However frequency control circuits are commonly implemented in order to control the frequency.

When the load currents are not very high, in order to reduce the number of external passive components, in particular the inductors, the same switching power converter can be configured to serve multiple different loads. In these configurations, multiple output power switches are used to select to which output of the converter, the energy (stored in the inductor) should be diverted at any time. Typically, since the output regulated voltages and the loads may be different from one another, only one output power switch is turned on at any given time and the transition to shift energy from one output to the other has to be performed making sure that no cross conduction is ever occurring.

This class of converters includes bucks (where all the outputs are regulated at a voltage lower than the input voltage), boosts (where all the outputs are regulated at a voltage higher than the input voltage), and buck-boosts (where the outputs may be regulated at voltages higher or lower than the input voltage) and hybrid configurations (where some outputs are regulated at voltages higher than the input voltage and some other at a voltage lower than the input voltage). In the case of the buck power converters there is an extra switch in the current path with respect to the more conventional approach of a power converter with a single output, while in the case of the boost power converters the number of the switches in the current path can be the same as for the more traditional boost power converter.

The main advantage of these converters, known as SIMO (Single Inductor Multiple Output) power converters is the reduction of the board space and associated cost due to the removal of the power inductors. In reality, a reduction of the EMI (Electro-Magnetic Interference) is also possible depending on the implementation adopted. Depending on the specific type of power converter another advantage is the reduction of power switches (more evident in the case of a SIMO boost) and of control circuitry. The most obvious disadvantage is that in some cases the efficiency of the converter may be lower with respect to the more conventional case. In particular for the case of the buck SIMO, the extra switch on the current path introduces a loss that is not present in the conventional buck converter.

Furthermore the current in the inductor is the sum of the load currents (in a SIMO buck converter) and since the DC losses, in the switching power transistor and in the inductor series resistance, are proportional to the square of the current, the losses are increased by the fact that the inductor is serving more outputs. For these reasons it is reasonable to assume that the advantage of the SIMO converter is more evident for low and middle level load currents in which case the efficiency can easily reach values in the order of 90%.

Another disadvantage is that, by serving multiple outputs, the output voltage ripple is typically higher than in the more conventional approach. In this case a compromise between the size of the output capacitors, the frequency of multiplexing the energy between the various outputs, and the number of outputs to be served may attenuate the effects of this drawback. Of course the problem is more severe for a large number of outputs.

A further disadvantage may be represented by the poor response to a load transient. This parameter is particularly important nowadays since the loads of the power converters are other integrated circuits that are periodically turned on and off quite frequently. The ability to respond very swiftly to a load change maintaining the minimum voltage droop or limiting the over-voltages is a very important parameter. If the power converter has to serve multiple outputs it is clearly more difficult to promptly respond to asynchronous load changes.

In this class of power converters two separate control loops can be identified. The first control loop is the one that determines the duty cycle and therefore the amount of energy to be stored in the inductor at any given time. This control loop is present in any type of switching power converter. The second control loop is the one that determines how to share the energy between the various outputs. This second loop is not present in the conventional switching power converters.

Many techniques have been developed to more effectively deal with these two control loops. There are several difficulties to overcome in operating Single Inductor Multiple Output converters. The first one is the so called "cross-regulation" which refers to the perturbations in the loops that affect one or more of the outputs when the one output is subject to a load transient. Ideally the power converter should operate to respond to the load transient of one of the outputs without affecting the other outputs. However this is very difficult to achieve because a load transient changes the level of energy in the inductor and that may be reflected onto all the outputs.

A second difficulty for these converters is the operation when the level of loads between different outputs is very dissimilar. For simplicity let us consider the case of a SIDO (Single Inductor Dual Output) where only two outputs are present and their loads are very different. In this case the energy in the inductor is adequate for one of the outputs and too large for the other one. This may cause loss of regulation, instability in the loops or very high voltage ripple for one of the outputs.

A third obstacle to be overcome for this type of power converter is the case in which one of the outputs supports a very light load while the other has a heavy load. In theory the light load output would require the converter to operate in DCM (Discontinuous Conduction Mode) while the other output would require operation in CCM (Continuous Conduction Mode). DCM makes reference to the discontinuous nature of the inductor current, which occurs when the current falls to zero at each period.

One of the solutions widely adopted to minimize the cross conduction is depicted in the block diagram of FIG. 1 for the case of a SIDO power converter. The transistors M1 and M2 are power devices whose duty cycle determines the energy to be stored at each cycle in the inductor L1. The power devices M3 and M4 represent the switches that divert the energy to either the output 1 or to the output 2. The control loop to drive the transistors M1 and M2 is conventional. The error amplifier 3 feeds the amplified error signal, generated by the difference between a signal representative of one of the outputs and a reference voltage to a comparator 1. The comparator 1 compares this amplified error signal to a ramp signal in order to determine the duty cycle.

Similarly, the error amplifier 4 and the comparator 5 generate the signal that drives the drivers block 6 to determine which of the power transistors M3 or M4 should be turned on to divert the energy flow to the corresponding output. In this configuration one of the outputs (output 2) is controlling the amount of energy in the inductor and the other output (output 1) is controlling the multiplexing of the energy to the outputs. This technique is simple and quite effective provided that the system is made stable, but its big drawback is that if the load at the output governing the amount of energy to be stored in the inductor drops significantly, the other output cannot be regulated anymore. On the other hand if both loads are large enough (both in CCM) this approach reduces significantly the cross regulation.

The prior art Lenk (U.S. Pat. No. 6,222,352) is an example of what described above where two separate loops are generated and where one output voltage governs the regulation of the inductor current and the other output voltage governs the sharing of the energy between the two outputs. In addition Lenk teaches the use of the body diode of the output power transistors to smoothly transition the transfer of energy from one output to the other.

Ivanov (U.S. Pat. No. 6,522,110) describes a single inductor multiple output buck-boost converter with general unspecified control topology. May (U.S. Pat. No. 6,977,447) reports a single inductor dual output boost power converter, where a load select module and a feedback module feed instantaneous information to a regulation module in order to process the relative information to operate the power converter.

The prior art Kranz (U.S. Pat. No. 7,176,661) is another example of a single inductor dual output boost power converter, where one output voltage signal is processed to control and modulate the energy stored in the inductor at any one time and one output voltage signal is processed to control the multiplexing of the energy between the two outputs. More interesting appears the approach taken by Chen et al. (U.S. Pat. No. 7,224,085) who describe a non conventional single inductor dual output buck converter with only three switches, where the energy stored in one of the outputs is used to provide power to the second output. However the output voltage ripple and the efficiency offered by this solution are not optimum.

Easwaran et al. (U.S. Pat. No. 8,049,472) describes a complex system to control a single inductor multiple output buck power converter where a series of error signals are generated and processed to control the energy into the inductor and the time division utilized for the multiplexing of the output switches.

However all the cited prior art does not describe a cost effective, accurate and simple method for achieving single inductor multiple output power conversion with optimum transient performance maintaining stability in all conditions. It is therefore a purpose of the present invention to describe a novel single inductor multiple output switching power converter that combines the characteristic of being simple, cost effective, having minimum cross regulation in all load conditions, excellent load transient performance and minimum size passive components.

It is another purpose of the present invention to describe a power converter that can exhibit minimum output voltage ripple. It is another purpose of the present invention to describe a constant frequency single inductor multiple output power converter that is stable and can operate at high switching frequencies.

SUMMARY OF THE INVENTION

It is an objective of the present invention to provide a single inductor multiple output power converter that achieves minimum cross regulation between its outputs in any load condition and load mismatch. It is another objective of the present invention to provide a single inductor multiple output (SIMO) switching power converter that achieves excellent regulation with minimum size of the inductor and output capacitors.

It is another objective of the present invention to provide a simple control of the energy to be stored in the inductor at any given time. It is another objective of the present invention to provide a method to obtain optimum load transient response for the power converter so as to minimize the output voltage excursion with minimum output capacitors, maintaining a stable system in all operating conditions.

The cited prior art makes use of conventional methods to control the duty cycle of the main switches in order to modulate the energy to be stored in the inductor. If and when the loads are very dissimilar it is quite difficult to find effective means to modulate the current in the inductor in synchronism with the multiplexing of the output switches. This is further complicated by the fact that the multiplexing of the output switches cannot occur at very low frequencies unless the output capacitors are increased in size significantly. On the other hand large output capacitors would occupy precious board space and would negatively affect the load transient response.

The present invention describes a single inductor multiple output switching power converter that can be controlled as a hysteretic power converter or as a minimum off-time or minimum on-time fixed frequency power converter. In particular it describes a power converter that generates one or more synthetic ripple signals to modulate the duty cycle and to multiplex the energy between the various outputs. The synthetic ripple signal is obtained by processing the information of the output voltages and of the inductor current. The inductor current sensing may be obtained in various ways.

The circuit, as depicted in FIG. 2, shows a single inductor dual output step down power converter, but similar considerations can be extended to multiple output power converters with more than two outputs. The power converter of FIG. 2 shows two main loops: the first one to control the duty cycle of the power devices M1 and M2 and the second loop to control the switching of the power devices M3 and M4. The power converter of FIG. 2 employs a minimum off-time type of control operating at constant frequency featuring the feedback network 16 that generates the synthetic ripple signal, but similar considerations can be made for a hysteretic type of control with a switching frequency control circuitry (PLL).

The synthetic ripple signal is a signal replica of the output voltage ripple but it is amplified to make it more immune to switching noise. Typically the feedback network 16 is constituted of passive elements but it could include transistors as well. The block diagram of FIG. 2 includes a comparator 9 that compares the synthetic ripple signal with a voltage reference 19 that is summed to a ramp signal generated by the block 11. The ramp signal is therefore superimposed to the reference voltage generating a periodic signal of the same frequency of the oscillator 10. This same frequency is the switching frequency of the main power transistors M1 and M2.

The oscillator 10 also provides a minimum off-time by periodically setting the the Flip Flop 8. The feedback network 16 employs the signal from the current sense block 17. The current sensing may be obtained by measuring the voltage drop across the transistors M3 and M4 and by summing together these two voltage drops or by sensing the voltage drop across the transistors M1 and M2 and by summing these two voltage drops. Other surrogate means are also possible as it is obvious to anyone skilled in the art.

The feedback network 15 is not necessarily structured the same way as the feedback network 16, however its output feeds the comparator 14 that compares this signal with the reference voltage 20. This reference voltage may be the same as reference voltage 19 but it may as well be a different one. The output of the comparator 14 is clocked by the D-Flip Flop 13 to limit the switching frequency of the output transistors M3 and M4. The clock at the node 18 may operate at the same frequency of the oscillator 10 but it may as well be totally different.

This topology is amenable to operate the power transistors M1 and M2 at very high frequency in order to minimize the size of the inductor L1. The advantage of this topology is that, differently from a pure hysteretic approach, it operates the power converter at a fixed known frequency maintaining a stable operation. The ability to switch a small inductor offers several advantages, in addition to the size of the inductor. For instance, even if the average inductor current is typically the sum of the load currents at its outputs, the inductor current can be modulated more easily in synchronism to the toggling of the output transistors in response to dissimilar loads.

If the power transistors M1 and M2 operate at high frequency, it may be advantageous to operate the transistors M3 and M4 at a much lower frequency in order to reduce the switching losses associated to the output transistors. However this constitutes a trade-off between the size of the output capacitors C1 and C2, the switching losses associated with the power transistors M3 and M4 and ultimately the acceptable output voltage ripple.

The comparator 14 could be implemented with a regenerative comparator or clocked comparator since its output depends on the value of its inputs at a specific instant of the clock. In that case the latch function would be included in the comparator. The clocked comparators are generally very fast, accurate and do not require high quiescent currents offering compelling advantages. Since the output power transistors M3 and M4 are typically of large dimensions a driver is required to switch them, and even though not depicted in FIG. 2, it is implicit and considered obvious to anyone skilled in the art.

It is also shown that the output power devices are NMOS components because it is assumed that the output voltages are regulated to relatively low voltages with respect to the input voltage, but it is clear that they can be replaced by PMOS, if the output voltage level was high enough to guarantee a low on-resistance when turned on, without changing the scope of the present invention.

The proposed structure offers the advantage of minimum cross regulation in continuous conduction mode, but if the load on output 2 drops to small values while the other load remains at significant levels, the loop that governs the amount of modulation of the energy stored in the inductor commands low energy while the other loop turns on M3 most of the time. In this case the voltage at output 1 is no longer regulated. This is not occurring if the low load is occurring at the output 1, however it may represent a not negligible disadvantage. On the other hand this proposed power converter operates with excellent performance if both outputs remain in CCM since it may operate at very high frequency reducing significantly the size of the inductor while speeding up the transient response.

This is documented in FIG. 3 which shows the simulation results of the single inductor multiple output power converter of FIG. 2 for a load transient that increments the load of one of the outputs. In this simulation the transistors M1 and M2 were operating at 80 MHz, while the clock 18 had a frequency of 40 MHz. The inductor value was 100 nH while the output capacitors were both 5 μF. The load at the output 1 was varied from 300 mA to 800 mA in 1 ns while the load at output 2 was fixed at 200 mA.

As can be noted the output 2, represented by the waveform 21, is not affected much by the load transient at the output 1 although its voltage ripple changes due to the different portion of energy that has to be multiplexed between the two outputs. However, even after the transient, the output voltage ripple is quite small (a few mV). It is also worth mentioning that the two outputs are regulated at different voltages. While output 1 is regulated at 1V, the output 2 is regulated at 2V. The clock 18 only sets the maximum frequency for the switching of the output power devices M3 and M4, in fact the toggling may occur at lower frequency than the clock, if the voltage of output 1 does not vary very quickly.

The inductor current, represented by the waveform 22, quickly rises to the new desired level when the load transient occurs, but the average inductor current is always equivalent to the sum of the loads. It should be noted that the inductor current exhibits a modulation of its level in correspondence of the switching of the output power devices M3 and M4. Also the voltage at output 1, represented by the waveform 25, is regulated quite well during the transient and simply varies its voltage ripple when its load current is higher.

Another topology of single inductor dual output buck is illustrated in FIG. 4, which represents the preferred embodiment of the present invention. There is a significant difference in this block diagram which is a single feedback network 26 that combines the information of both output voltages in addition to the instantaneous inductor current to provide a synthetic ripple signal 29 that accounts for the total energy to be delivered by the power transistors M1 and M2. In addition the clocked comparator 28 compare the two output voltages scaled back to a desired value.

The fact that the synthetic ripple signal 29 takes into account the overall energy requirement of all the loads allows the functioning of the power converter regardless of the difference in load levels. In fact this approach combines all the advantages of the embodiment of FIG. 2, (like the fact that it can operate at very high fixed frequency, or that the output power devices can operate at a maximum set frequency, or that the cross regulation is minimized) to the ability to function properly if any load is very light. In this case the comparator 28 moves the energy to the lower output voltage regardless of their value, but the feedback network 26 controls the overall energy. The scope of the invention would not change if the comparator 28 compared two error signals rather than the scaled output voltages directly.

This specific case is shown in the simulation results of FIG. 5. In fact, in this case, the load at the output 1 is abruptly (1 ns) brought from 300 mA to 1 mA while maintaining the other load at 800 mA. The other conditions are the same as for the simulation of FIG. 3, that is the transistor M1 and M2 were operating at 80 MHz, while the clock of the comparator 28 had a frequency of 40 MHz. The inductor value was 100 nH and the output capacitors had both a value of 5 µF.

As can be noted the voltage of the output 2, represented by the waveform 31, is not affected much by the load transient at the output 1, although its voltage ripple changes due to the different portion of energy that has to be multiplexed between the two outputs. In this case the output voltage ripple decreases because the load after the transient is lower. Also it is worth mentioning that the two outputs are regulated at different voltages. While output 1 is regulated at 1V, the output 2 is regulated at 2V.

The inductor current, represented by the waveform 30 quickly falls to the new desired average level when the load transient occurs although the average current is still equivalent to the sum of the loads. It should be noted that the inductor current exhibits a modulation of its level depending on the switching of the output power devices M3 and M4. Furthermore, the voltage at output 1, represented by the waveform 34, is regulated quite well during and after the transient despite of the large mismatch of loads at the outputs (800 mA versus 1 mA). The ability to switch the energy to another output could result in a load transient response better than what would have been obtained for a conventional buck power converter with a single output.

Although not herein documented, the topology of FIG. 4 offers similar performance if the abrupt decrease in load had occurred at the output 2. Furthermore, the topology of FIG. 4 performs extremely well for any load change.

The block diagram shown on FIG. 6 describes a single inductor dual output boost power converter with a topology similar to the one depicted in FIG. 2 for the buck. In FIG. 6 there is only one power transistor (M5) to determine the amount of energy stored in the inductor, but there could be another one placed across the inductor L2 to re-circulate the current when energy is stored in the inductor and both outputs do not require any additional energy. The possible addition of an extra power transistor would not change the scope of the present invention.

In the shown block diagram the output power transistors M6 and M7 are PMOS because it is assumed that the regulated output voltages be higher than the input voltages. Similarly to the case of FIG. 2 two loops can be identified: the first determines the duty cycle of the power transistor M5, and is governed by the feedback network 40 that keeps into account the voltage of the output 2 and the inductor current whereas, the second loop determines the switching of the output power transistors M6 and M7 in order to multiplex the energy between the two outputs, and is governed by the feedback network 39 that processes the voltage of the output 1 and the inductor current.

The feedback network 40 generates the synthetic ripple signal 41 similarly to what has been done for hysteretic power converters, but the signal 41 is compared with a reference voltage 19 summed to a fixed frequency ramp signal to force a minimum off-time or minimum on-time in order to guarantee operation of the transistor M5 at the same constant frequency of the oscillator 10. However the topology of FIG. 6 would equally perform if the control were hysteretic with means of regulating the switching frequency. Since this is a boost power converter the sensing of the inductor current is necessary to obtain stable regulation of the output voltages. The feedback network 39 generates a second signal to be compared with a reference voltage 42, which is not necessarily the same as the reference voltage 10.

In this case the block 36 includes the pre-drivers of the power transistors M6 and M7 and the required logic, in fact the power devices M6 and M7 must operate in alternate ways, but none of the two can be turned on while the transistor M5 is turned on. This constitutes a major difference with the case of the buck of FIG. 2. Furthermore, differently from the SIMO buck converter, the SIMO boost configuration does not require an additional power switch on the main current path with respect to the more conventional boost power converter topology. This implies efficiency for the single inductor multiple output boost power converter similar to the one of a traditional boost converter.

Similar to the case of the buck of FIG. 2, a clocked comparator (37) allows the toggling of the power transistors M6 and M7 at a maximum frequency, that not necessarily is the same as the switching frequency of the power transistor M5. Again the separation of the two loops significantly improves the cross regulation phenomenon but limits the operation to the case when the two loads are not very dissimilar and in particular when one of the two is very light.

The simulation results of the circuit of FIG. 6 are shown in FIG. 7 for a load transient in which none of the two outputs drops to very low levels. In this simulation the transistor M5 was operating at 40 MHz, while the clock frequency of the clocked comparator 37 was 20 MHz. The inductor value was 100 nH while the output capacitors had both a value of 5 µF. The load at the output 1 was varied from 200 mA to 800 mA in 1 ns, while the load at output 2 was constant at 300 mA.

As can be noted, the output 2, represented by the waveform 47, is not affected much by the load transient at the output 1 although its voltage ripple changes slightly due to the different amount of energy that has to be multiplexed between the two outputs. Nevertheless, the output voltage ripple is contained. Also it is worth mentioning that the two outputs are regulated at different voltages. While output 1 is regulated at 5V, the output 2 is regulated at 4.5V. The clock of the clocked comparator only sets the maximum frequency of the switching of the output power devices M6 and M7, in fact the toggling may occur at lower frequency than the clock if the voltage of the output 1 does not vary very frequently.

The inductor current, represented by the waveform 44 quickly rises to the new desired level when the load transient occurs, but the average inductor current is always equivalent to the level necessary to serve both loads. It should be noted that the inductor current exhibits a modulation of its level depending on the switching of the output power devices M6 and M7. Also the voltage of output 1, represented by the waveform 43, is not drooping significantly during the transient and it is regulated quite well after the transient simply varying its voltage ripple when its load current is higher.

Similarly to what has been proposed for the single inductor multiple output buck power converter, in order to extend the operation to the case of very light load for one of the outputs, a different configuration of the boost converter, shown in FIG. 8, has been proposed. In an analogous way to what has been described for FIG. 4, in this case, a single feedback network, that keeps into account the voltage of both outputs and the inductor current at any time, generates the synthetic ripple signal 49. This signal is including the information of overall energy to be stored in the inductor for all the outputs of the power converter.

Therefore, also in the case one of the outputs drops its load to very low levels, the synthetic ripple signal 49 accounts for a total current needed to regulate both outputs. Of course this approach may be easily extended to the case of more than two outputs. The synthetic ripple signal is compared by the comparator 9 with the reference voltage 19 to which a ramp signal 11 has been summed. In addition the oscillator 10 provides the minimum off-time (or minimum on-time) required to guarantee a fixed frequency operation for the power transistor M5.

The clocked comparator 37 compares the scaled down versions of the output voltages and drives the block 36 to drive the power transistors M6 and M7 in order to divert the energy from one output to the other, depending on their condition from time to time. In the shown block diagram of FIG. 8 the output voltages are compared, for simplicity, but similarly the error voltages of the outputs could be compared without changing the scope of the present invention.

The operation of this type of converter in the proposed configuration is shown in the simulation results of FIG. 9, when a load transient, that reduces significantly the load of one output to very low levels occurs. In this simulation the transistor M5 was operating at 40 MHz, while the clock frequency of the clocked comparator 37 was 20 MHz. The inductor value was 100 nH while the output capacitors had both a value of 5 μF. The load at the output 2 was varied from 300 mA to 1 mA in 1 ns, while the load at output 1 was constant at 800 mA.

As can be noted, the output 1, represented by the waveform 54, is not affected much by the load transient at the output 2, although its voltage ripple reduces due to the different amount of energy that gets multiplexed between the two outputs. After the transient the output 1 voltage ripple is smaller since the output power device M6 is kept on most of the time while M7 is kept off most of the time. Also it is worth mentioning that the two outputs are regulated at different voltages. While output 1 is regulated at 5V, the output 2 is regulated at 4.5V. The clock of the clocked comparator only sets the maximum frequency of the multiplexing of the output power devices M6 and M7, in fact the toggling may occur at lower frequency than the one of the clock if one of voltages of the outputs does not vary very frequently, as it is the case after the transient of FIG. 9.

The inductor current, represented by the waveform 50 quickly falls to the new desired level when the load transient occurs, but the average inductor current is always equivalent to the level necessary to serve both loads. It should be noted that the inductor current exhibits a modulation of its level depending on the switching of the output power devices M6 and M7. Also the voltage of output 2, represented by the waveform 51, is not overshooting during the transient.

Nowadays a common requirement is the ability to lower the regulated output voltage of a power converter, depending on the load condition of the computing chip powered by the converter, in order to slow down its operation and to save precious battery power. This feature is called DVS (Dynamic Voltage Scaling) and generally modern power converters have to include it. FIG. 10 shows the simulation results of the single inductor dual output buck power converter of FIG. 4 for the case of DVS of output 2. The output 2 is commanded to lower its regulated voltage by 200 mV and later to recover from this voltage drop.

In this simulation the power transistors M1 and M2 were operating at 80 MHz. The inductor value was 100 nH while the output capacitors had both a value of 5 μF. The load at the output 2 was constant at 800 mA, while the load at output 1 was constant at 300 mA. As can be noted the output 1, represented by the waveform 59, is not affected significantly by the changes in the regulated output voltage of output 2. A slight perturbation is showing in correspondence of the change in the inductor current, represented by the waveform 56, in order for the power converter to adjust to the new regulated value of the output 2.

It can be observed that while the inductor current exhibits a positive spike to high values (approaching about 5 A), both output voltages perform quite smoothly during the whole transition. Again the performance, including the output voltage ripple can be further improved by the adjustment of the value of the output capacitors or by the rate of change of the multiplexing of the output power transistor in response to variations of the output voltages.

All the previously shown simulations have proved the excellent performance for the cases of single inductor dual output power converter, but the proposed system architectures perform very well also for a higher number of outputs. FIG. 11 in fact demonstrates that for the extension to three output of the preferred embodiment of FIG. 4 where the feedback network 26 includes the information of the output voltage of all three outputs and the comparator 28 compares the scaled voltage of the three outputs to determine how to divert the energy from the inductor to the outputs.

FIG. 11 shows a load transient on output 1 (waveform 63) keeping the other two output with constant load (200 mA) as represented by overlapped waveforms 64 and 65. As soon as the load at the output 1 is increased, the current (waveform 62) swiftly adjusts to the new value, but the voltage at the outputs 2 and 3 is not affected significantly by the load change, although the voltage ripple somewhat grows leading to the interesting observation that the output voltage ripple of the outputs depends on the total amount of energy that gets transferred to the loads. Also for the simulation of FIG. 11 the power transistors M1 and M2 were operating at 80 MHz, the inductor value was 100 nH while the output capacitors had all three a value of 5 μF.

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 2

Figure 1:
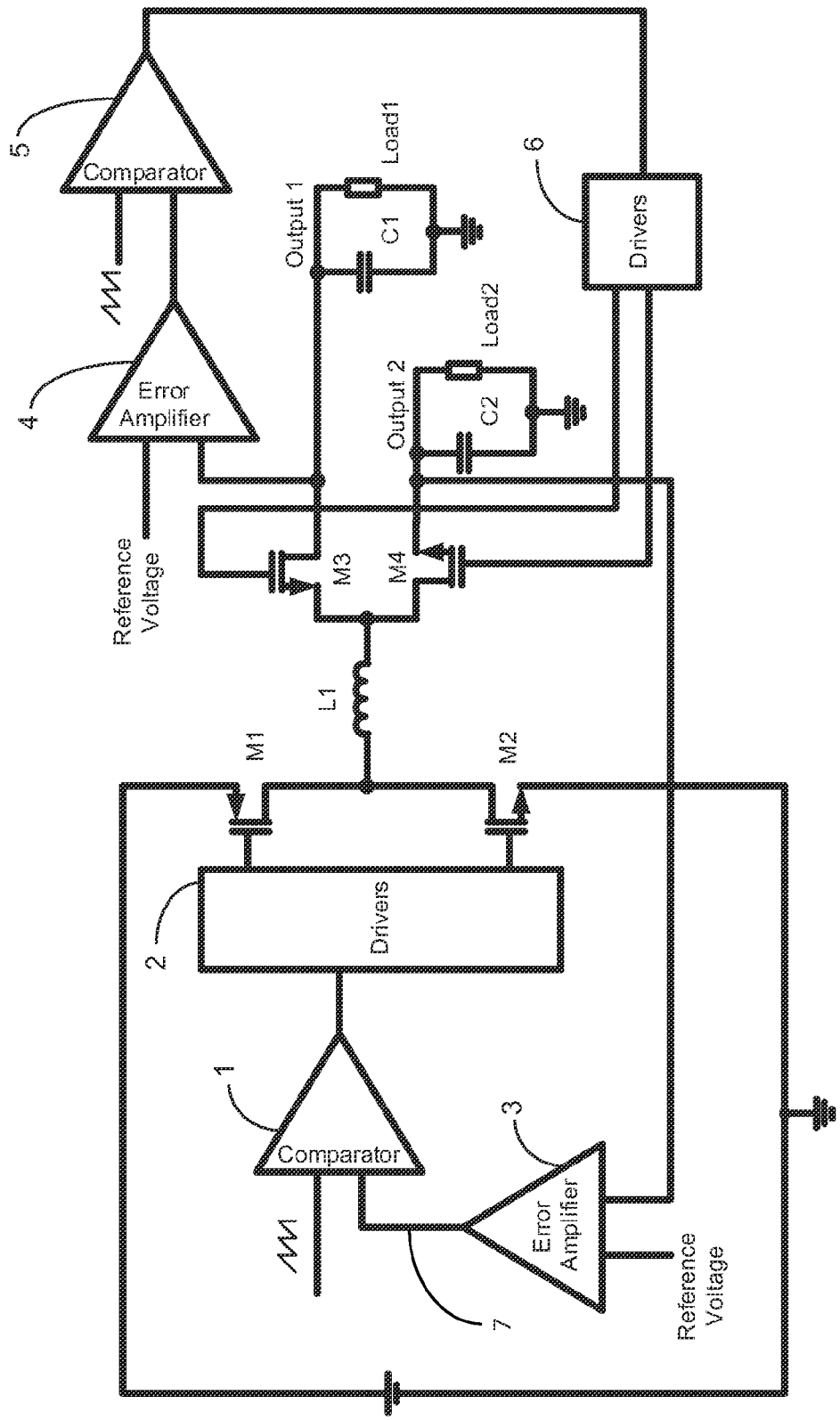
FIG. 1 shows a block diagram of a single inductor dual output buck power converter topology with conventional general control circuit (prior art).
Figure 2A:
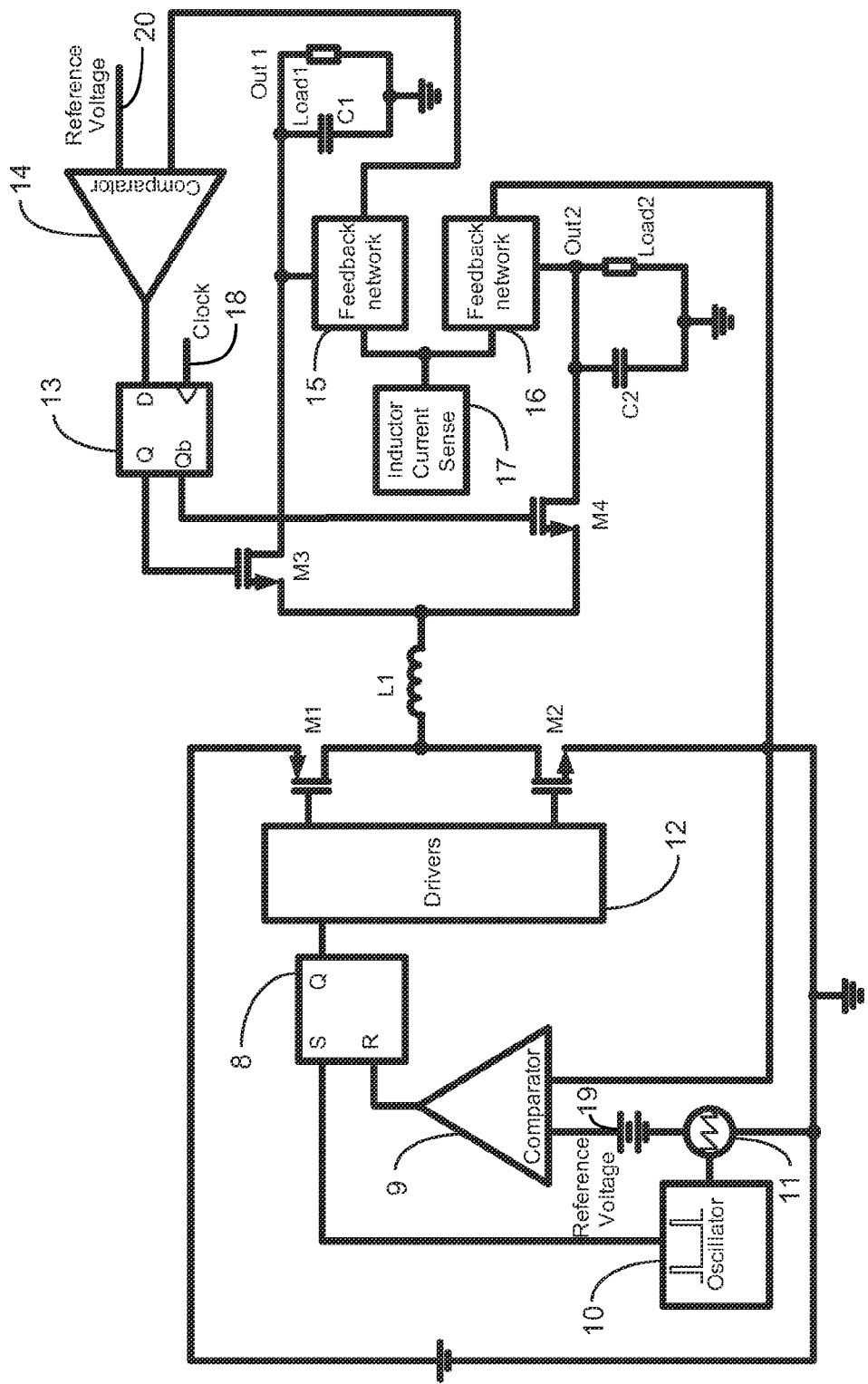
FIG. 2 shows the block diagram schematic of a single inductor dual output buck switching power converter according to a first embodiment of the present invention.
Figure 2B:
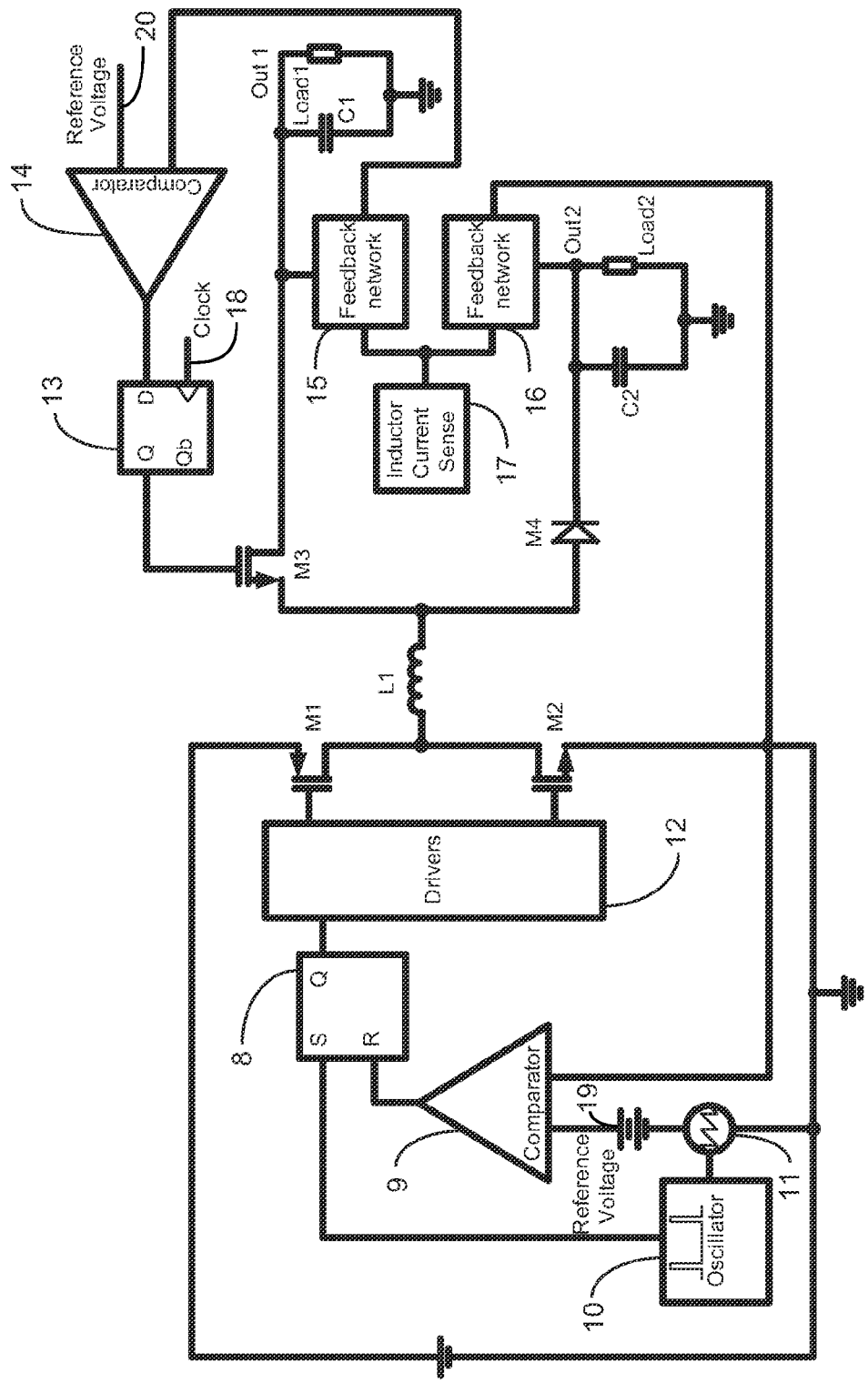

The circuit, as depicted in FIG. 2, shows a single inductor dual output step down power converter, but similar considerations can be extended to multiple output power converters with more than two outputs. The power converter of FIG. 2 shows two main loops: the first one to control the duty cycle of the power devices M1 and M2 and the second loop to control the switching of the power devices M3 and M4. The power converter of FIG. 2 employs a minimum off-time type of control operating at constant frequency featuring the feedback network 16 that generates the synthetic ripple signal, but similar considerations can be made for a hysteretic type of control with a switching frequency control circuitry (PLL).

The synthetic ripple signal is a signal replica of the output voltage ripple but it is amplified to make it more immune to switching noise. Typically the feedback network 16 is constituted of passive elements but it could include transistors as well. The block diagram of FIG. 2 includes a comparator 9 that compares the synthetic ripple signal with a voltage reference 19 that is summed to a ramp signal generated by the block 11. The ramp signal is therefore superimposed to the reference voltage generating a periodic signal of the same frequency of the oscillator 10. This same frequency is the same switching frequency of the main power transistors M1 and M2.

The oscillator 10 also provides a minimum off-time by periodically setting the the Flip Flop 8. The feedback network 16 employs the signal from the current sense block 17. The current sensing may be obtained by measuring the voltage drop across the transistors M3 and M4 and by summing together these two voltage drops or by sensing the voltage drop across the transistors M1 and M2 and by summing these two voltage drops. Other surrogate means are also possible as it is obvious to anyone skilled in the art.

The feedback network 15 is not necessarily structured the same way as the feedback network 16, however its output feeds the comparator 14 that compares this signal with the reference voltage 20. This reference voltage may be the same as reference voltage 19 but it may as well be a different one. The output of the comparator 14 is clocked by the D-Flip Flop 13 to limit the switching frequency of the output transistors M3 and M4. The clock at the node 18 may operate at the same frequency of the oscillator 10 but it may as well be totally different.

This topology is amenable to operate the power transistors M1 and M2 at very high frequency in order to minimize the size of the inductor L1. The advantage of this topology is that, differently from a pure hysteretic approach, it operates the power converter at a fixed known frequency maintaining a stable operation. The ability to switch a small inductor offers several advantages, in addition to the size of the inductor. For instance, even if the average inductor current is typically the sum of the load currents at its outputs, the inductor current can be modulated more easily in synchronism to the toggling of the output transistors in response to dissimilar loads.

If the power transistors M1 and M2 operate at high frequency, it may be advantageous to operate the transistors M3 and M4 at a much lower frequency in order to reduce the switching losses associated to the output transistors. However this constitutes a trade-off between the size of the output capacitors C1 and C2, the switching losses associated with the power transistors M3 and M4 and ultimately the acceptable output voltage ripple.

The comparator 14 could be implemented with a regenerative comparator or clocked comparator since its output depends on the value of its inputs at a specific instant of the clock. In that case the latch function would be included in the comparator. The clocked comparators are generally very fast, accurate and do not require high quiescent currents offering compelling advantages. Since the output power transistors M3 and M4 are typically of large dimensions a driver is required to switch them, and even though not depicted in FIG. 2, it is implicit and considered obvious to anyone skilled in the art.

It is also shown that the output power devices are NMOS components because it is assumed that the output voltages are regulated to relatively low voltages with respect to the input voltage, but it is clear that they can be replaced by PMOS, if the output voltage level was high enough to guarantee a low on resistance when turned on, without changing the scope of the present invention.

The proposed structure offers the advantage of minimum cross regulation in continuous conduction mode, but if the load of the output 2 drops to small values while the other load remains at significant levels, the loop that governs the amount of modulation of the energy stored in the inductor commands low energy while the other loop turns on M3 most of the time. In this case the voltage at output 1 is no longer regulated. This is not occurring if the low load is occurring at the output 1, however it may represent a not negligible disadvantage. On the other hand this proposed power converter operates with excellent performance if both outputs remain in CCM since it may operate at very high frequency reducing significantly the size of the inductor while speeding up the transient response.
B FIG. 3

Figure 3:
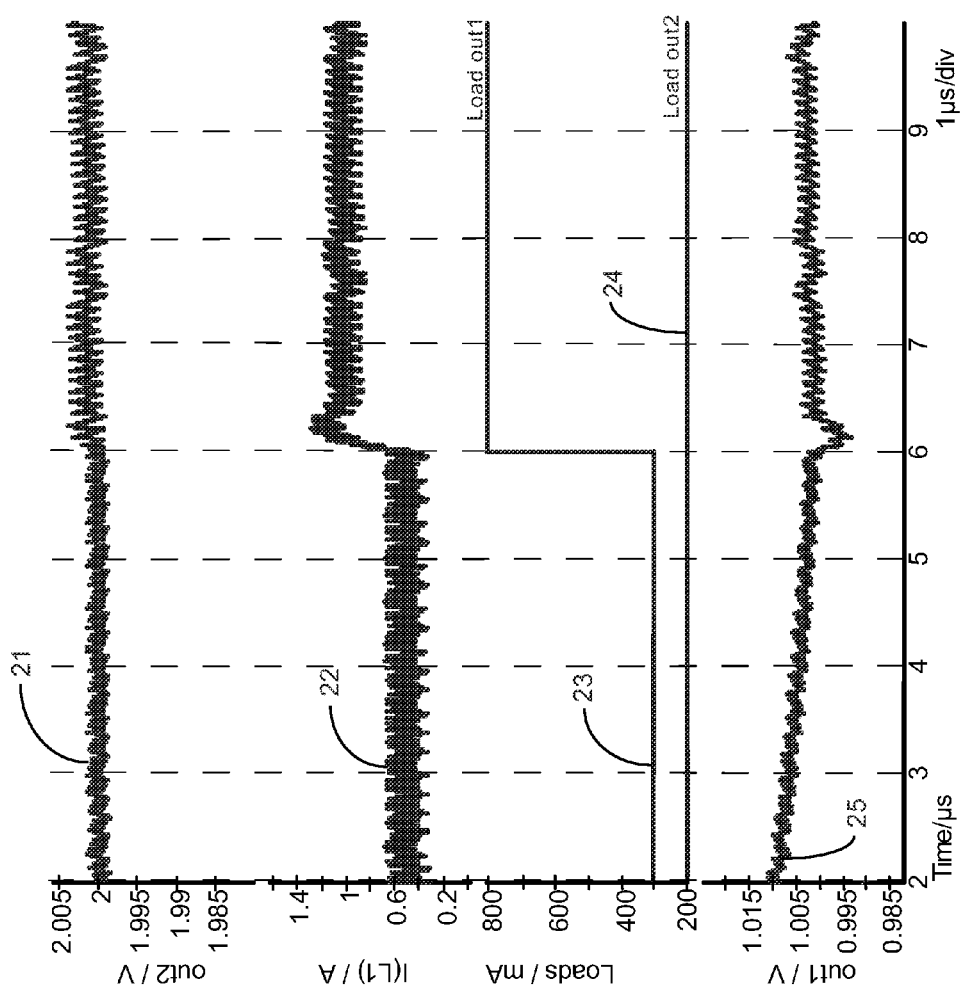
FIG. 3 shows the waveforms of the most significant voltages and currents as result of the circuit simulation of the single inductor dual output buck power converter of FIG. 2 for a load transient.

This is documented in FIG. 3 which shows the simulation results of the single inductor multiple output power converter of FIG. 2 for a load transient that increments the load of one of the outputs. In this simulation the transistor M1 and M2 were operating at 80 MHz, while the clock 18 had a frequency of 40 MHz. The inductor value was 100 nH while the output capacitors were both 5 μF. The load at the output 1 was varied from 300 mA to 800 mA in 1 ns while the load at output 2 was fixed at 200 mA.

As can be noted the output 2, represented by the waveform 21, is not affected much by the load transient at the output 1 although its voltage ripple changes due to the different portion of energy that has to be multiplexed between the two outputs. However, even after the transient, the output voltage ripple is quite small (a few mV). It is also worth mentioning that the two outputs are regulated at different voltages. While output 1 is regulated at 1V, the output 2 is regulated at 2V. The clock 18 only sets the maximum frequency for the switching of the output power devices M3 and M4, in fact the toggling may occur at lower frequency than the clock, if the voltage of output 1 does not vary very quickly.

The inductor current, represented by the waveform 22, quickly rises to the new desired level when the load transient occurs, but the average inductor current is always equivalent to the sum of the loads. It should be noted that the inductor current exhibits a modulation of its level in correspondence of the switching of the output power devices M3 and M4. Also the voltage at output 1, represented by the waveform 25, is regulated quite well during the transient and simply varies its voltage ripple when its load current is higher.
C FIG. 4

Figure 4:
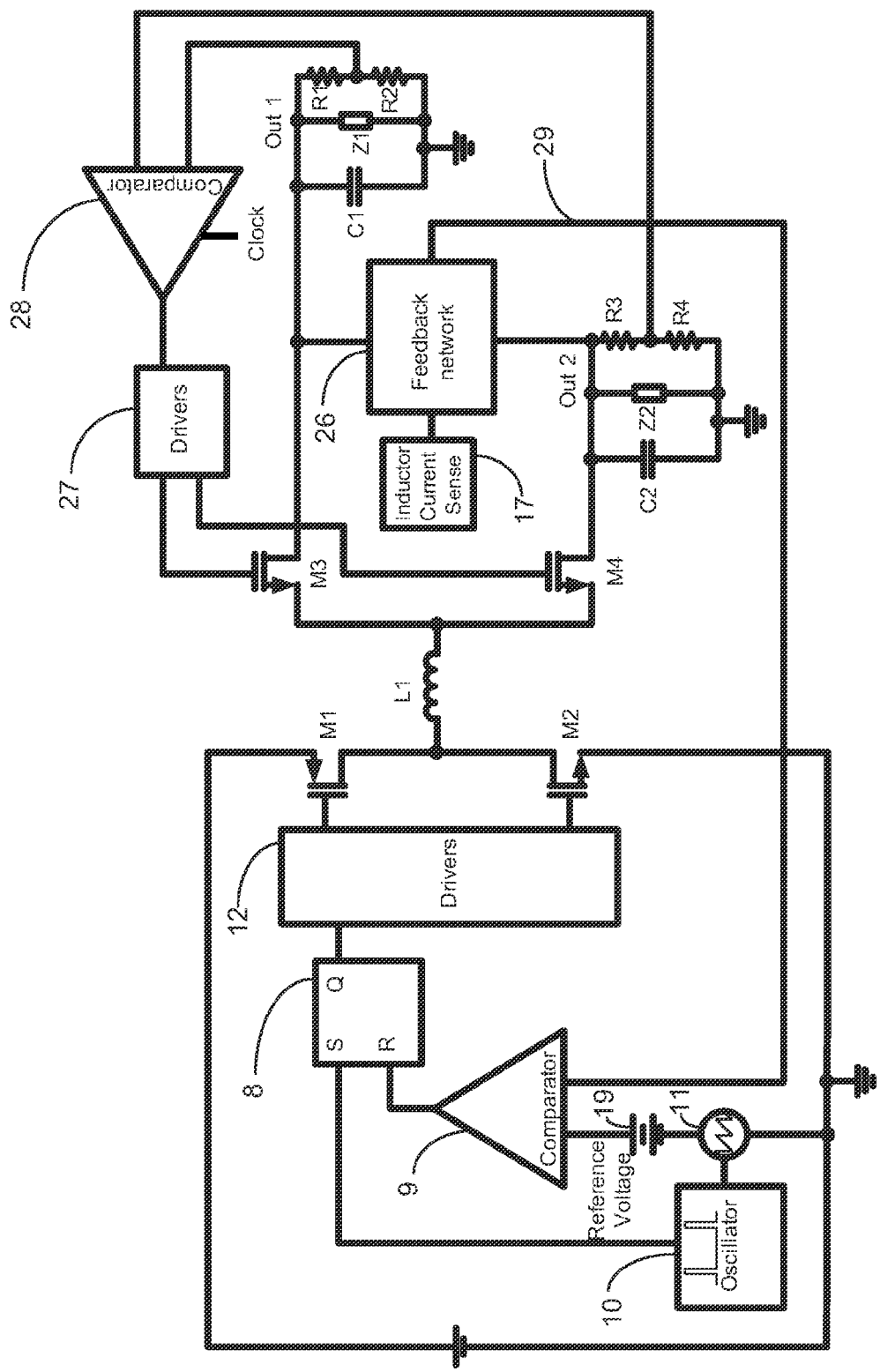
FIG. 4 shows a block diagram schematic of a single inductor dual output buck switching power converter according to a preferred embodiment of the present invention.

Another topology of single inductor dual output buck is illustrated in FIG. 4, which represents the preferred embodiment of the present invention. There is a significant difference in this block diagram which is a single feedback network 26 that combines the information of both output voltages in addition to the instantaneous inductor current to provide a synthetic ripple signal 29 that accounts for the total energy to be delivered by the power transistors M1 and M2. In addition the clocked comparator 28 compares the two output voltages scaled back to a desired value.

The fact that the synthetic ripple signal 29 takes into account the overall energy requirement of all the loads allows the functioning of the power converter regardless of the difference in load levels. In fact this approach combines all the advantages of the embodiment of FIG. 2, (like the fact that it can operate at very high fixed frequency, or that the output power devices can operate at a maximum set frequency, or that the cross regulation is minimized) to the ability to function properly if any load is very light. In this case the comparator 28 moves the energy to the lower output voltage regardless of their value, but the feedback network 26 controls the overall energy. The scope of the invention would not change if the comparator 28 compared two error signals rather than the scaled output voltages directly.

Although not herein documented, the topology of FIG. 4 offers similar performance if the abrupt decrease in load had occurred at the output 2. Furthermore the topology of FIG. 4 performs extremely well for any load change.
D FIG. 5

Figure 5:
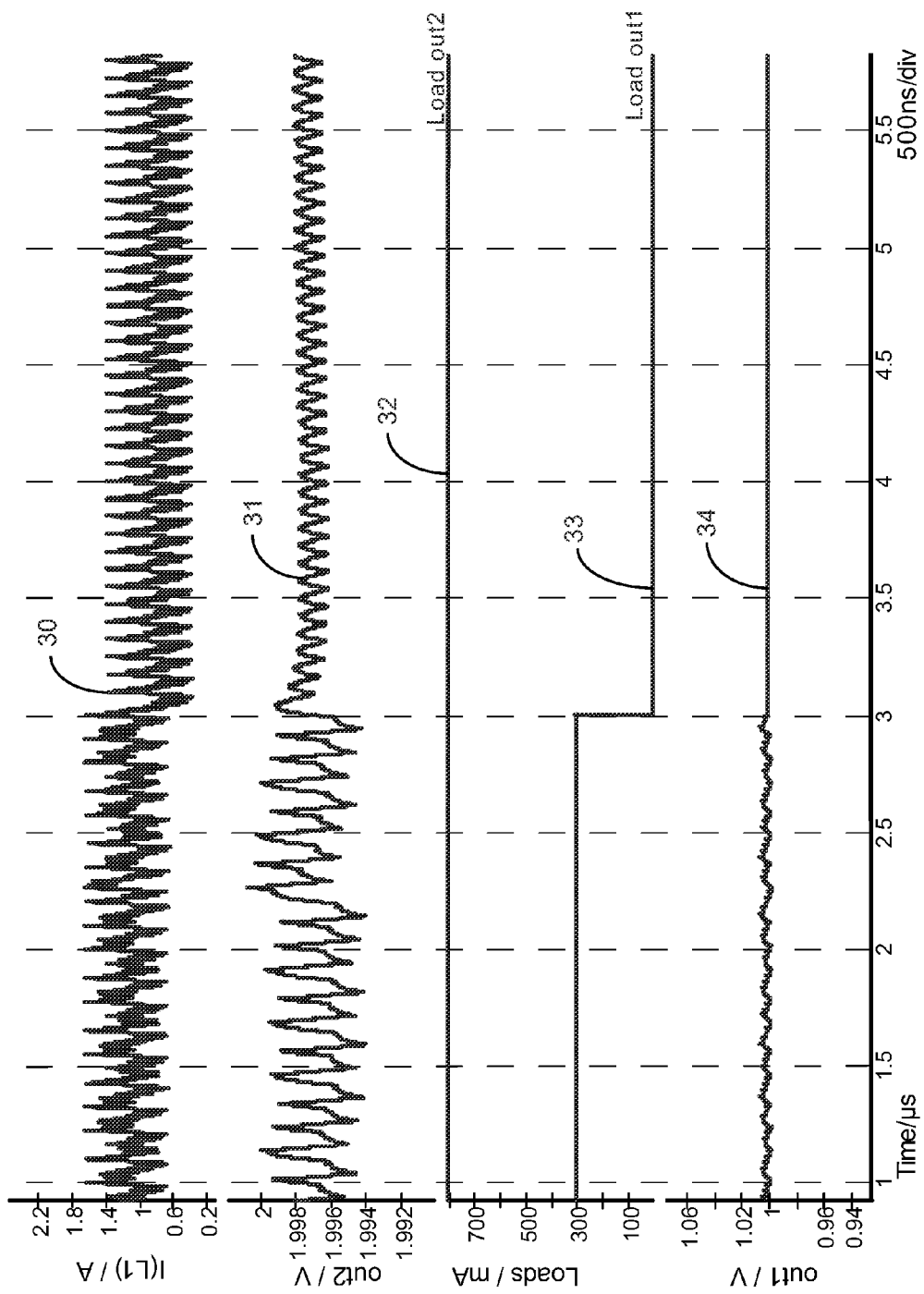
FIG. 5 shows the waveforms of the most significant voltages and currents as result of the circuit simulation of the single inductor dual output buck power converter according to the embodiment of FIG. 4 for a load transient.

In the case of FIG. 5, the load at the output 1 is abruptly (1 ns) brought from 300 mA to 1 mA while maintaining the other load at 800 mA. The other conditions are the same as for the simulation of FIG. 3, that is the transistors M1 and M2 were operating at 80 MHz, while the clock of the comparator 28 had a frequency of 40 MHz. The inductor value was 100 nH and the output capacitors had both a value of 5 μF.

As can be noted the voltage of the output 2, represented by the waveform 31, is not affected much by the load transient at the output 1, although its voltage ripple changes due to the different portion of energy that has to be multiplexed between the two outputs. In this case the output voltage ripple decreases because the load after the transient is lower. Also it is worth mentioning that the two outputs are regulated at different voltages. While output 1 is regulated at 1V, the output 2 is regulated at 2V.

The inductor current, represented by the waveform 30 quickly falls to the new desired average level when the load transient occurs although the average current is still equivalent to the sum of the loads. It should be noted that the inductor current exhibits a modulation of its level depending on the switching of the output power devices M3 and M4. Also the voltage at output 1, represented by the waveform 34, is regulated quite well during and after the transient despite of the large mismatch of loads at the outputs (800 mA versus 1 mA). The ability to switch the energy to another output could result in a load transient response better than what would have been obtained for a conventional buck power converter with a single output.
E FIG. 6

Figure 6A:
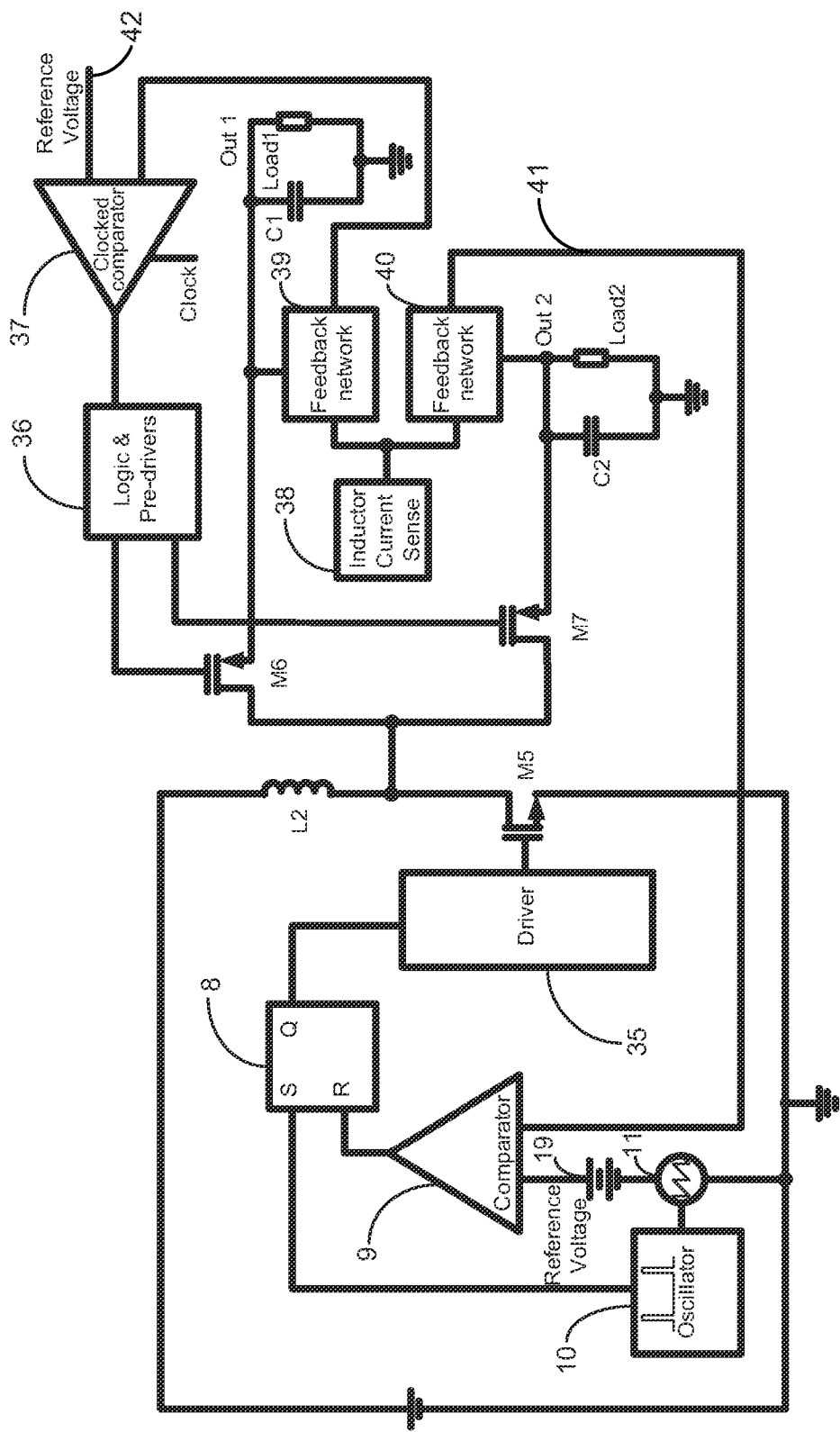
FIG. 6 shows the block diagram schematic of a single inductor dual output boost switching power converter according to a further embodiment of the present invention.
Figure 6B:
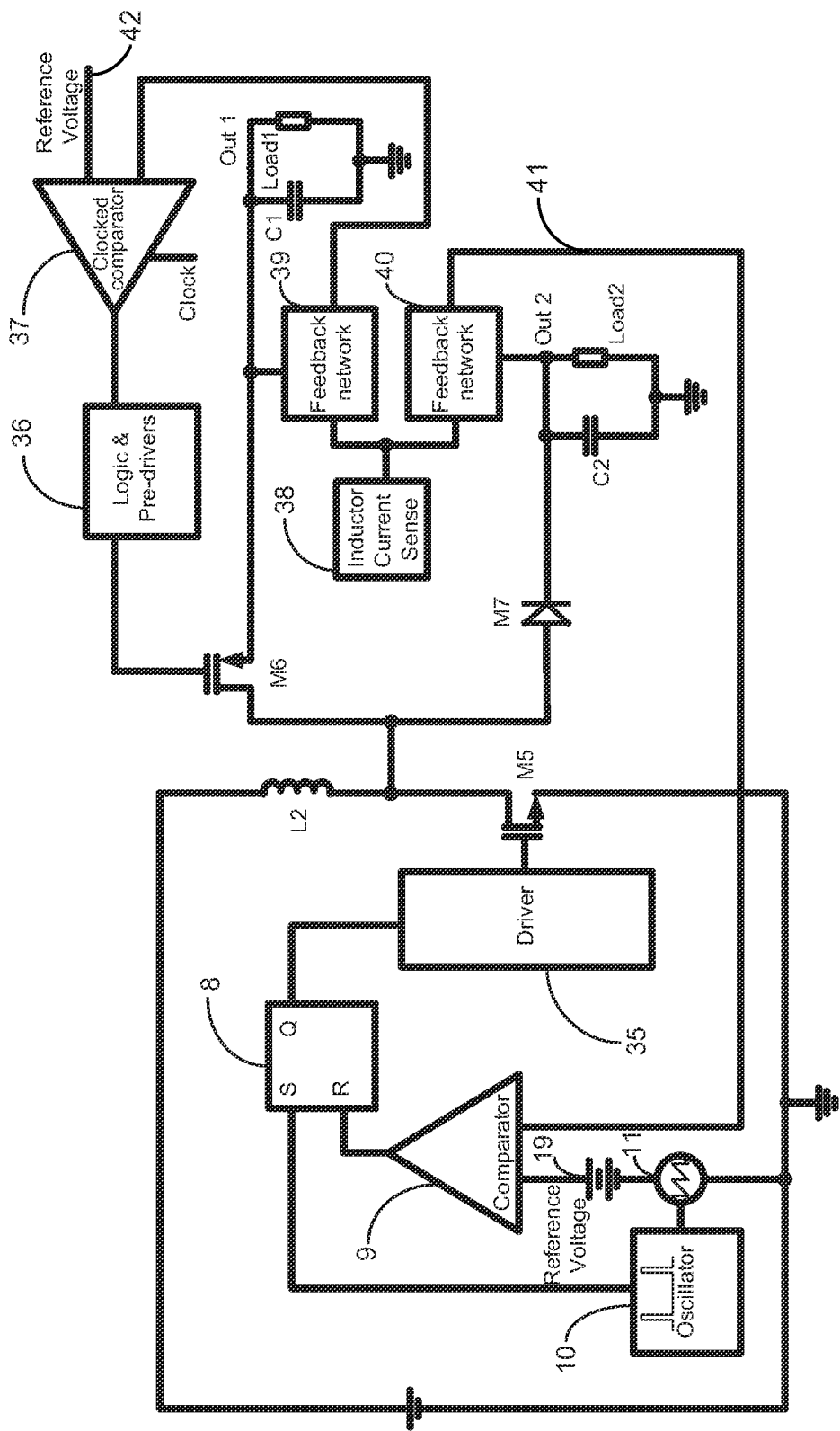

The block diagram shown on FIG. 6 describes a single inductor dual output boost power converter with a topology similar to the one depicted in FIG. 2 for the buck. In FIG. 6 there is only one power transistor (M5) to determine the amount of energy stored in the inductor, but there could be another one placed across the inductor L2 to re-circulate the current when energy is stored in the inductor and both outputs do not require any additional energy. The possible addition of an extra power transistor would not change the scope of the present invention.

In the shown block diagram the output power transistors M6 and M7 are PMOS because it is assumed that the regulated output voltages be higher than the input voltages. Similarly to the case of FIG. 2 two loops can be identified: the first one determines the duty cycle of the power transistor M5, and is governed by the feedback network 40 that keeps into account the voltage of the output 2 and the inductor current, whereas the second loop determines the switching of the output power transistors M6 and M7 to multiplex the energy between the two outputs, and is governed by the feedback network 39 that processes the voltage of the output 1 and the inductor current.

The feedback network 40 generates the synthetic ripple signal 41 similarly to what has been done for hysteretic power converters, but the signal 41 is compared with a reference voltage 19 summed to a fixed frequency ramp signal to force a minimum off-time or minimum on-time in order to guarantee operation of the transistor M5 at the same constant frequency of the oscillator 10. However the topology of FIG. 6 would equally perform if the control were hysteretic with means of regulating the switching frequency. Since this is a boost power converter the sensing of the inductor current is necessary to obtain stable regulation of the output voltages. The feedback network 39 generates a second signal to be compared with a reference voltage 42, which is not necessarily the same as the reference voltage 10.

In this case the block 36 includes the pre-drivers of the power transistors M6 and M7 and the required logic, in fact the power devices M6 and M7 must operate in alternate ways, but none of the two can be turned on while the transistor M5 is turned on. This constitutes a major difference with the case of the buck of FIG. 2. Furthermore differently from the SIMO buck configurations, the SIMO boost lacks the additional power switch on the main current path with respect to the more conventional boost power converter topology. This implies higher efficiency for the single inductor multiple output boost power converter similar to the one of a traditional boost converter.

Similar to the case of the buck of FIG. 2, a clocked comparator (37) allows the toggling of the power transistors M6 and M7 at a maximum frequency, which not necessarily is the same as the switching frequency of the power transistor M5. Again the separation of the two loops significantly improves the cross regulation phenomenon but limits the operation to the case when the two loads are not very dissimilar and in particular when one of the two is very light.

F FIG. 7

Figure 7:
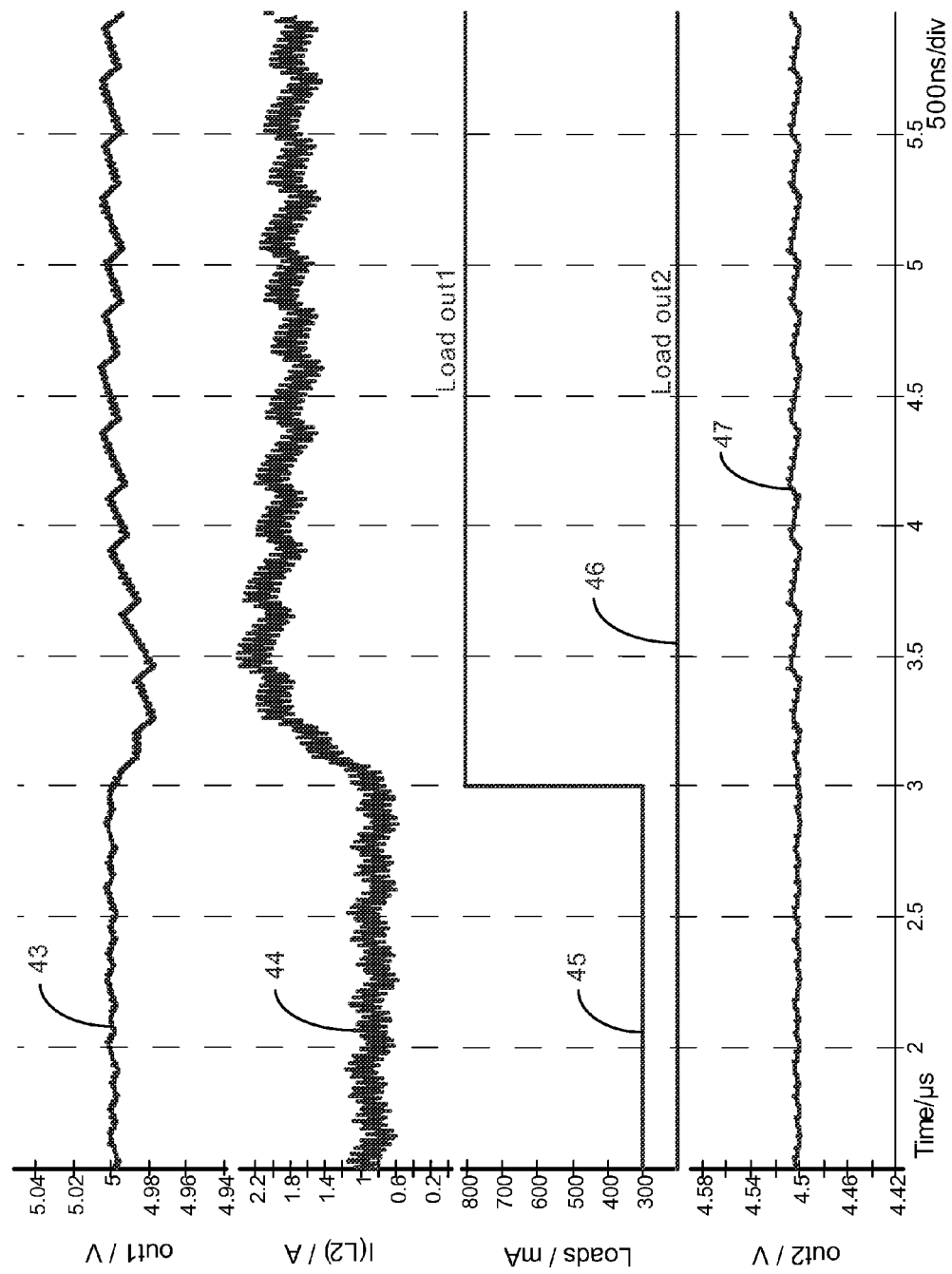
FIG. 7 shows the waveforms of the most significant voltages and currents as result of the circuit simulation of the single inductor dual output boost power converter according to the embodiment of FIG. 6 for a load transient.

The simulation results of the circuit of FIG. 6 are shown in FIG. 7 for a load transient in which none of the two outputs drops to very low levels. In this simulation the transistor M5 was operating at 40 MHz, while the clock frequency of the clocked comparator 37 was 20 MHz. The inductor value was 100 nH while the output capacitors had both a value of 5 µF. The load at the output 1 was varied from 200 mA to 800 mA in 1 ns, while the load at output 2 was constant at 300 mA.

As can be noted, the output 2, represented by the waveform 47, is not affected much by the load transient at the output 1 although its voltage ripple changes slightly due to the different amount of energy that has to be multiplexed between the two outputs. Nevertheless, the output voltage ripple is contained. Also it is worth mentioning that the two outputs are regulated at different voltages. While output 1 is regulated at 5V, the output 2 is regulated at 4.5V. The clock of the clocked comparator only sets the maximum frequency of the switching of the output power devices M6 and M7, in fact the toggling may occur at lower frequency than the clock if the voltage of the output 1 does not vary very frequently.

The inductor current, represented by the waveform 44 quickly rises to the new desired level when the load transient occurs, but the average inductor current is always equivalent to the level necessary to serve both loads. It should be noted that the inductor current exhibits a modulation of its level depending on the switching of the output power devices M6 and M7. Also the voltage of output 1, represented by the waveform 43, is not drooping significantly during the transient and it is regulated quite well after the transient simply varying its voltage ripple when its load current is higher.

G FIG. 8

Figure 8:
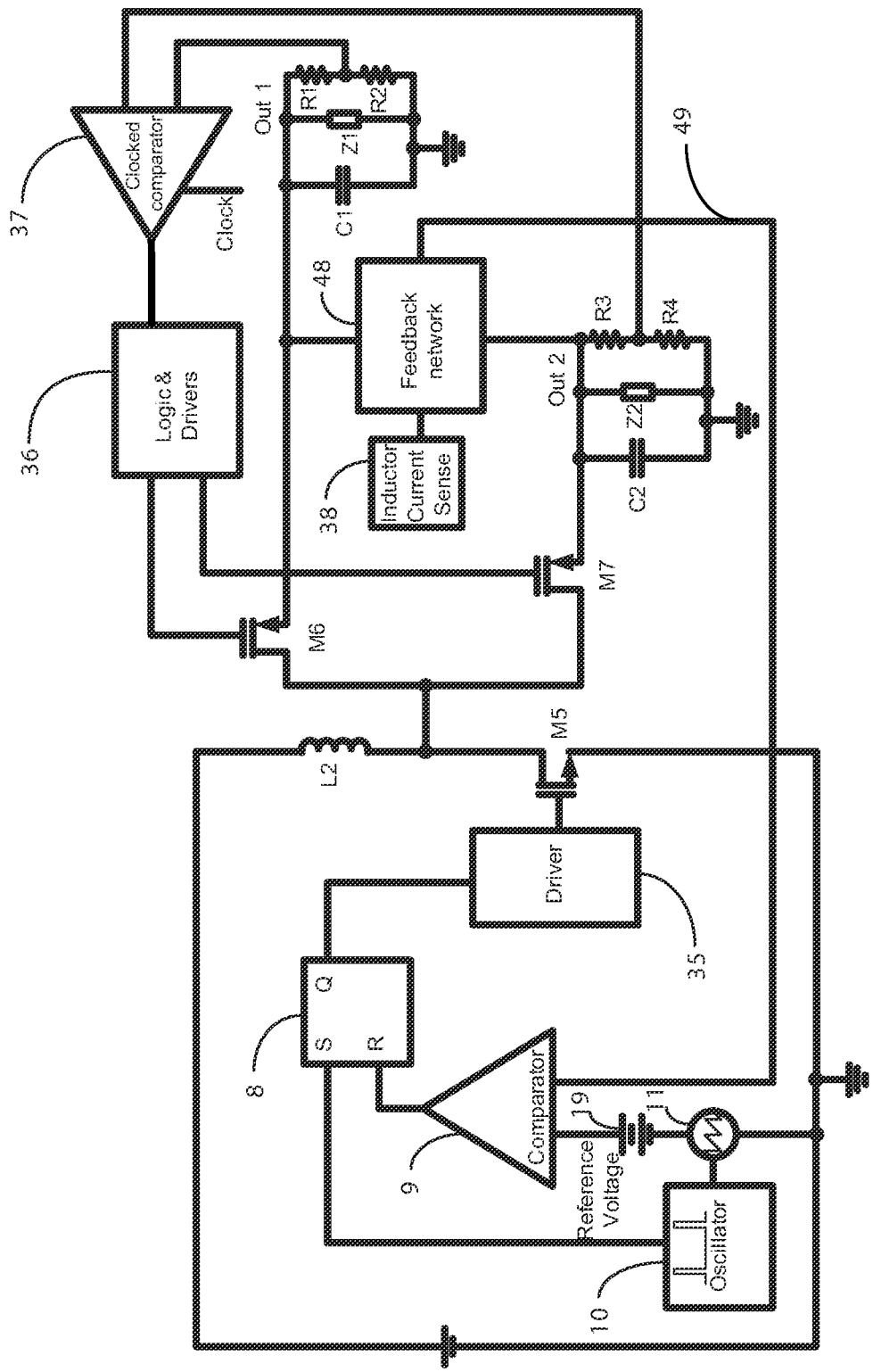
FIG. 8 shows the block diagram schematic of a single inductor dual output boost switching power converter according to a further embodiment of the present invention.

Similarly to what has been proposed for the single inductor multiple output buck power converter, in order to extend the operation to the case of very light load for one of the outputs, a different configuration of the boost converter, shown in FIG. 8, has been proposed. In an analogous way to what has been described for FIG. 4, in this case, a single feedback network, that keeps into account the voltage of both outputs and the inductor current at any time, generates the synthetic ripple signal 49. This signal is including the information of overall energy to be stored in the inductor for all the outputs of the power converter.

Therefore, also in the case one of the outputs drops its load to very low levels, the synthetic ripple signal 49 accounts for a total current needed to regulate both outputs. Of course this approach may be easily extended to the case of more than two outputs. The synthetic ripple signal is compared by the comparator 9 with the reference voltage 19 to which a ramp signal 11 has been summed. In addition the oscillator 10 provides the minimum off-time (or minimum on-time) required to guarantee a fixed frequency operation for the power transistor M5.

The clocked comparator 37 compares the scaled down versions of the output voltages and drives the block 36 to drive the power transistors M6 and M7 in order to divert the energy from one output to the other, depending on their condition from time to time. In the shown block diagram of FIG. 8 the output voltages are compared, for simplicity, but similarly the error voltages of the outputs could be compared without changing the scope of the present invention.

H FIG. 9

Figure 9:
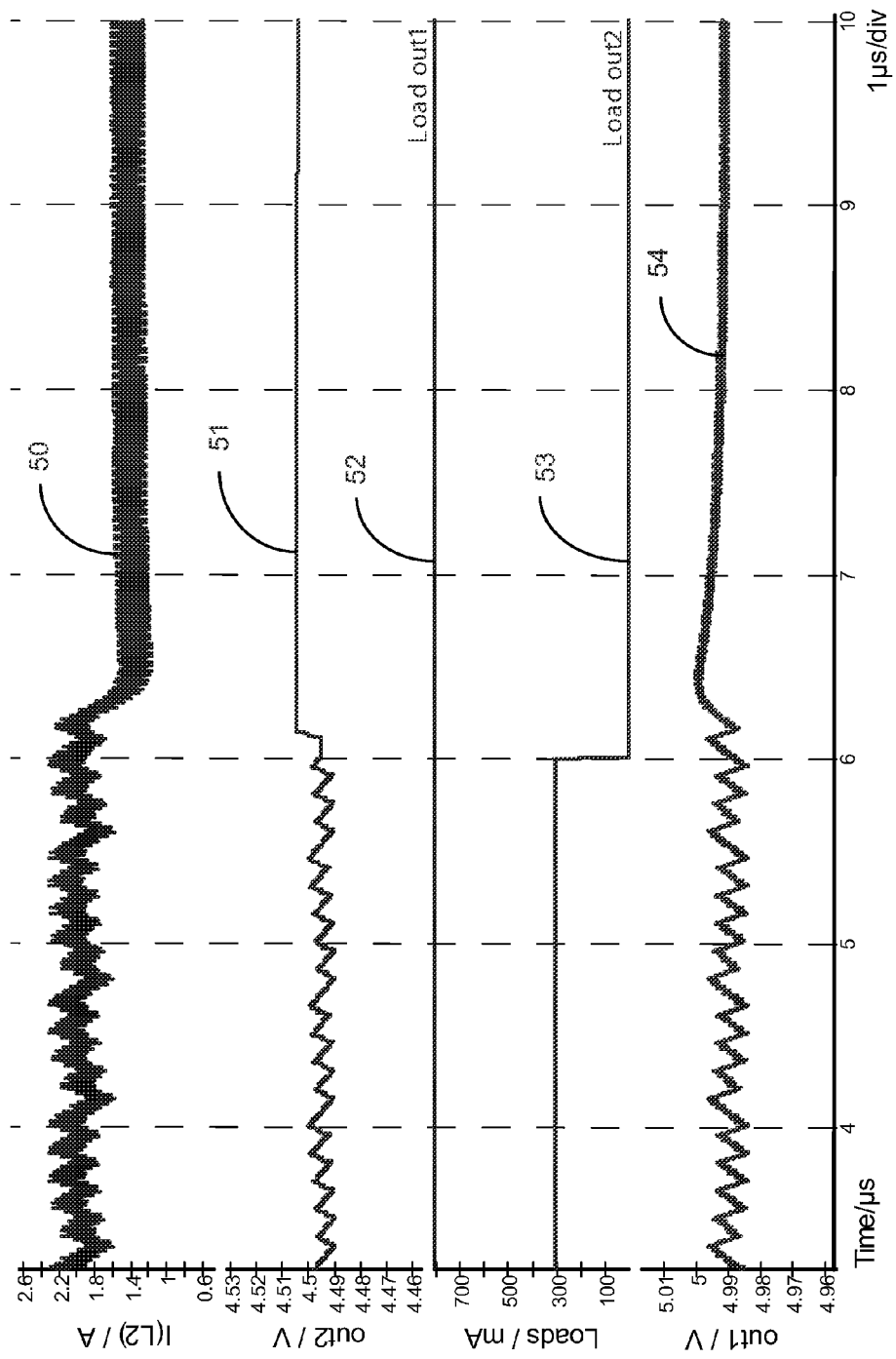
FIG. 9 shows the waveforms of the most significant voltages and currents as result of the circuit simulation of the single inductor dual output boost power converter according to the embodiment of FIG. 8 for a load transient.

The operation of this type of converter in the proposed configuration is shown in the simulation results of FIG. 9, when a load transient, that reduces significantly the load of one output to very low levels occurs. In this simulation the transistor M5 was operating at 40 MHz, while the clock frequency of the clocked comparator 37 was 20 MHz. The inductor value was 100 nH while the output capacitors had both a value of 5 µF. The load at the output 2 was varied from 300 mA to 1 mA in 1 ns, while the load at output 1 was constant at 800 mA.

As can be noted, the output 1, represented by the waveform 54, is not affected much by the load transient at the output 2, although its voltage ripple reduces due to the different amount of energy that gets multiplexed between the two outputs. After the transient the output 1 voltage ripple is smaller since the output power device M6 is kept on most of the time while M7 is kept off most of the time. Also it is worth mentioning that the two outputs are regulated at different voltages. While output 1 is regulated at 5V, the output 2 is regulated at 4.5V. The clock of the clocked comparator only sets the maximum frequency of the multiplexing of the output power devices M6 and M7, in fact the toggling may occur at lower frequency than the one of the clock if one of voltages of the outputs does not vary very frequently, as it is the case after the transient of FIG. 9.

The inductor current, represented by the waveform 50 quickly falls to the new desired level when the load transient occurs, but the average inductor current is always equivalent to the level necessary to serve both loads. It should be noted that the inductor current exhibits a modulation of its level depending on the switching of the output power devices M6 and M7. Also the voltage of output 2, represented by the waveform 51, is not overshooting during the transient.

I FIG. 10

Figure 10:
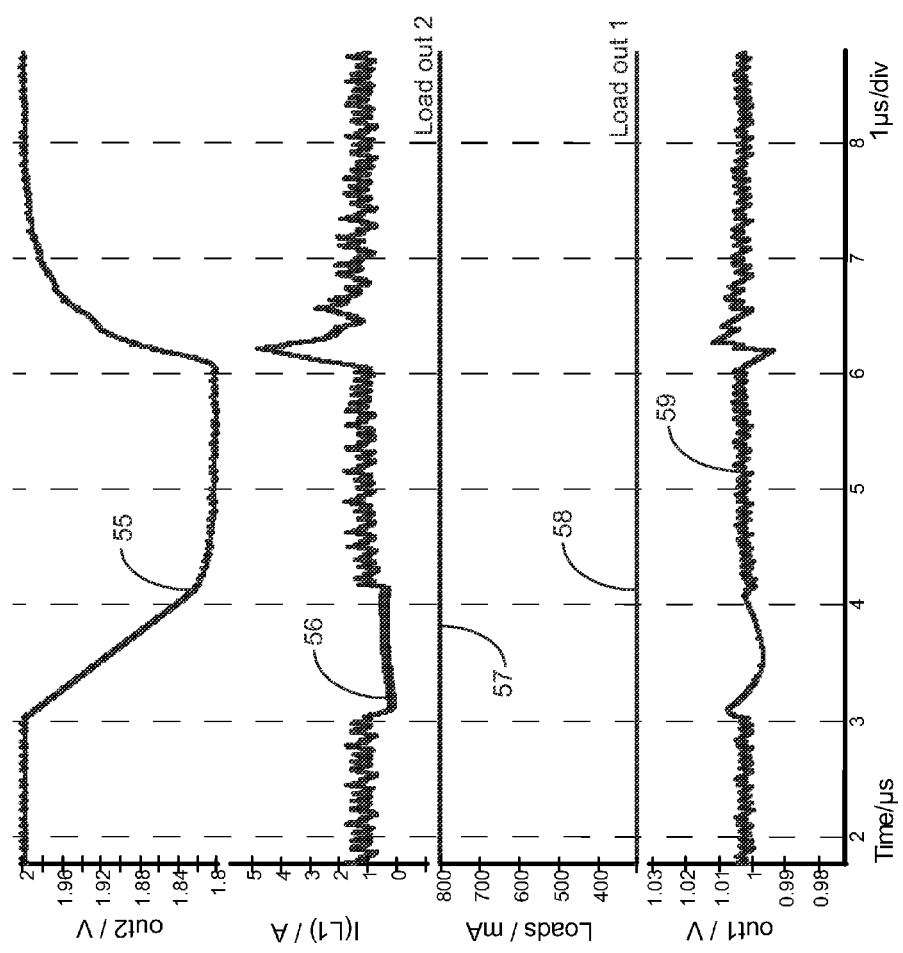
FIG. 10 shows the waveforms of the most significant voltages and currents as result of the circuit simulation of the single inductor dual output buck power converter according to the embodiment of FIG. 4 for a DVS (Dynamic Voltage Scaling) transient.

Nowadays a common requirement is the ability to lower the regulated output voltage of a power converter, depending on the load condition of the computing chip powered by the converter, in order to slow down its operation and to save precious battery power. This feature is called DVS (Dynamic Voltage Scaling) and generally modern power converters have to include it. FIG. 10 shows the simulation results of the single inductor dual output buck power converter of FIG. 4 for the case of DVS of output 2. The output 2 is commanded to lower its regulated voltage by 200 mV and later to recover from this voltage drop.

In this simulation the power transistors M1 and M2 were operating at 80 MHz. The inductor value was 100 nH while the output capacitors had both a value of 5 µF. The load at the output 2 was constant at 800 mA, while the load at output 1 was constant at 300 mA. As can be noted the output 1, represented by the waveform 59, is not affected significantly by the changes in the regulated output voltage of output 2. A slight perturbation is showing in correspondence of the change in the inductor current, represented by the waveform 56, in order for the power converter to adjust to the new regulated value of the output 2.

It can be observed that while the inductor current exhibits a positive spike to high values (approaching about 5 A), both output voltages perform quite smoothly during the whole transition. Again the performance, including the output voltage ripple can be further improved by the adjustment of the value of the output capacitors or by the rate of change of the multiplexing of the output power transistor in response to variations of the output voltages.

J FIG. 11

Figure 11:
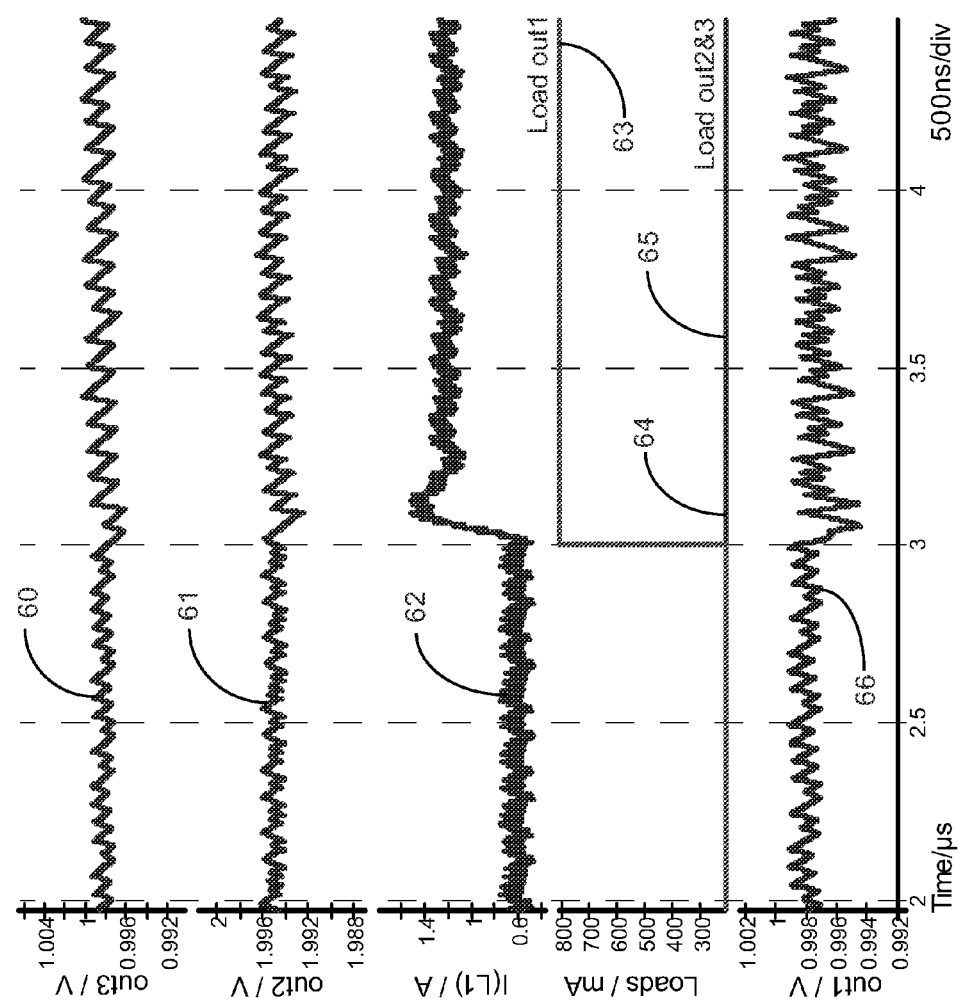
FIG. 11 shows the waveforms of the most significant voltages and currents as result of the circuit simulation of the single inductor triple output buck power converter according to the extension to three outputs of the embodiment of FIG. 4 for a load transient.

All the previously shown simulations have proved the excellent performance for the cases of single inductor dual output power converter, but the proposed system architectures perform very well also for a higher number of outputs. FIG. 11 in fact demonstrates that for the extension to three output of the preferred embodiment of FIG. 4 where the feedback network 26 includes the information of the output voltage of all three outputs and the comparator 28 compares the scaled voltage of the three outputs to determine how to divert the energy from the inductor to the outputs.

FIG. 11 shows a load transient on output 1 (waveform 63) keeping the other two output with constant load (200 mA) as represented by overlapped waveforms 64 and 65. As soon as the load at the output 1 is increased the current (waveform 62) swiftly adjusts to the new value, but the voltage at the outputs 2 and 3 is not affected significantly by the load change, although the voltage ripple somewhat grows leading to the interesting observation that the output voltage ripple of the outputs depends on the total amount of energy that gets transferred to the loads. Also for the simulation of FIG. 11 the power transistors M1 and M2 were operating at 80 MHz, the inductor value was 100 nH while the output capacitors had all three a value of 5 μF.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A single inductor multiple output switching power converter comprising:
at least one main power device;
at least one output power device;
at least one feedback network;
a first comparator;
at least one second comparator;
wherein at least one of said main power devices is switched to store energy in said single inductor;
wherein at least one of said output power devices is switched to divert said energy to said multiple outputs;
wherein at least one of said feedback networks generates a synthetic ripple signal;
whereby said synthetic ripple signal is coupled to said first comparator to determine the switching duty cycle of said main power devices;
whereby at least one of said second comparators operates to determine which of said output power devices is turned on at any time, and
whereby the voltage of said multiple outputs is regulated.

2. The single inductor multiple output switching power converter of claim 1 further comprising a current sense circuit to generate a signal responsive to the current in said single inductor,
wherein at least one of said feedback networks is coupled to at least one of said multiple outputs and to said current sense circuit, and
whereby said synthetic ripple signal is also responsive to said current in said single inductor.

3. The single inductor multiple output switching power converter of claim 1, wherein at least one of said second comparators is a regenerative comparator with a clock input, and
wherein the frequency of said clock input is setting the maximum frequency of multiplexing said energy between said multiple outputs.

4. The single inductor multiple output switching power converter of claim 1, wherein said power converter belongs to the class of switching power converters comprising the buck power converter, the boost power converter and the buck-boost power converter.

5. The single inductor multiple output switching power converter of claim 1, wherein said power converter comprises at least a first output of said multiple outputs whose regulated voltage is lower than the input voltage of said single inductor multiple output switching power converter and at least a second output of said multiple outputs whose regulated voltage is higher than said input voltage of said single inductor multiple output switching power converter.

6. The single inductor multiple output switching power converter of claim 1, wherein the control mechanism of said switching power converter belongs to a group comprising hysteretic control, minimum off-time fixed frequency synthetic ripple control and minimum on-time fixed frequency synthetic ripple control.

7. The single inductor multiple output switching power converter of claim 1, wherein said main power devices operate at a switching frequency different than the switching frequency of said output power devices.

8. The single inductor multiple output switching power converter of claim 1, wherein the current in a load of at least one of said multiple outputs is regulated.

9. The single inductor multiple output switching power converter of claim 1, wherein at least one of said output power devices is a diode.

10. A single inductor multiple output switching power converter comprising:
at least one main power device;
at least one output power devices;
at least one feedback network;
a first comparator;
at least one second comparator;
a current sense circuit to generate a signal responsive to the current in said single inductor;
wherein at least one of said main power devices is switched to store energy in said single inductor;
wherein at least one of said output power devices is switched to divert said energy to said multiple outputs;
wherein at least one of said feedback networks is coupled to said multiple outputs and to said current sense circuit to generate a synthetic ripple signal responsive to a voltage of at least one of said multiple outputs and to said current in said single inductor;
whereby said synthetic ripple signal is coupled to said first comparator to determine the switching duty cycle of said main power devices;

whereby at least one of said second comparators operates to determine which of said output power devices is turned on at any time, and whereby the voltage of said multiple outputs is regulated.

11. The single inductor multiple output switching power converter of claim 10, wherein at least one of said second comparators is a regenerative comparator with a clock input, and wherein the frequency of said clock input is setting the maximum frequency of multiplexing said energy between said multiple outputs.

12. A method to convert power by means of a single inductor multiple output switching power converter comprising:

coupling said single inductor to at least one main power device and to at least one output power device;

generating a synthetic ripple signal in response to a voltage of at least one of said multiple outputs;

switching said main power devices to store energy in said single inductor;

switching at least one of said output power devices to divert said energy to said multiple outputs;

comparing, by means of a first comparator, said synthetic ripple signal with a reference signal to determine the duty cycle of said main power devices;

coupling at least one second comparator to at least one of said multiple outputs;

whereby said comparator determines which of said output power devices is turned on at any time, and whereby the voltage of said multiple outputs is regulated.

13. The method of claim 12, wherein said reference signal is a constituted by a voltage reference summed to a ramp signal with frequency substantially equivalent to the switching frequency of said main power devices.

14. The method of claim 12, wherein said synthetic ripple signal is also responsive to the current in said single inductor.

15. The method of claim 12, wherein at least one of said second comparators is a regenerative comparator with a clock input, and wherein the frequency of said clock input is setting the maximum frequency of multiplexing said energy between said multiple outputs.

16. The method of claim 12, wherein said single inductor multiple output switching power converter belongs to the class of switching power converters comprising the buck power converter, the boost power converter and the buck-boost power converter.

17. The method of claim 12, wherein the control mechanism of said switching power converter belongs to a group comprising hysteretic control, minimum off-time fixed frequency synthetic ripple control and minimum on-time fixed frequency synthetic ripple control.

18. The method of claim 12, wherein said main power devices operate at a switching frequency different than the switching frequency of said output power devices.

19. The method of claim 12, wherein the current in a load of at least one of said multiple outputs is regulated.

20. The method of claim 12, wherein at least one of said output power devices is a diode.

* * * * *